United States Patent
Hutt et al.

(10) Patent No.: US 11,772,867 B2
(45) Date of Patent: Oct. 3, 2023

(54) METHOD OF FORMING A PACKAGING

(71) Applicant: Anheuser-Busch InBev S.A., Brussels (BE)

(72) Inventors: Douglas Hutt, Woking (GB); Gerhard Klink, Munich (DE); Johan-Dieter Hemmetzberger, Munich (DE)

(73) Assignee: Ahneuser-Busch InBev S.A., Brussels (BE)

( * ) Notice: Subject to any disclaimer, the term of this patent is extended or adjusted under 35 U.S.C. 154(b) by 0 days.

(21) Appl. No.: 17/069,754

(22) Filed: Oct. 13, 2020

(65) Prior Publication Data
US 2023/0093699 A1 Mar. 23, 2023

Related U.S. Application Data

(63) Continuation of application No. 16/538,757, filed on Aug. 12, 2019, now abandoned, which is a
(Continued)

(30) Foreign Application Priority Data

Jul. 25, 2014 (GB) ...................................... 1413197

(51) Int. Cl.
*B65D 71/56* (2006.01)
*B65D 5/00* (2006.01)
(Continued)

(52) U.S. Cl.
CPC .......... *B65D 71/0014* (2013.01); *B32B 37/12* (2013.01); *B65D 5/00* (2013.01);
(Continued)

(58) Field of Classification Search
CPC . B32B 37/12; B32B 2553/00; B65D 71/0014; B65D 71/56; B65D 79/00;
(Continued)

(56) References Cited

U.S. PATENT DOCUMENTS

| | | |
|---|---|---|
| 2,236,243 A | 3/1941 | Cornelius |
| 2,319,101 A | 5/1943 | Anderson |

(Continued)

FOREIGN PATENT DOCUMENTS

| | | |
|---|---|---|
| DE | 8812756 | 12/1988 |
| DE | 9109177 | 10/1991 |

(Continued)

OTHER PUBLICATIONS

Ray, "Printed electronics: Not just blinking beer bottles," The Register, dated May 4, 2012, <https://www.theregister.com/2012/05/04/printed_electronics/> (5 pages).

*Primary Examiner* — Bryon P Gehman
(74) *Attorney, Agent, or Firm* — Michael Best & Friedrich LLP

(57) ABSTRACT

A method of forming packaging accommodates one or more products and packaging produced by the method. The method includes providing a planar packaging blank of foldable material and assembling it into packaging capable of accommodating at least one product. A flexible electronics module on the packaging blank has at least one temperature measurement device and a temperature display to measure and display the temperature of at least one of the products. The positioning of the flexible electronics module with respect to the packaging permits both to be folded together to form the assembled packaging. The packaging is foldable from a first unassembled state to a second assembled state to accommodate at least one product, and the electronics module is at least partly flexible to enable it to be folded with the packaging. The packaging may hold six beverage containers and might be considered to be a "six pack."

20 Claims, 5 Drawing Sheets

Related U.S. Application Data continuation of application No. 15/328,887, filed as application No. PCT/GB2015/052137 on Jul. 23, 2015, now abandoned.

(51) Int. Cl.

| | | |
|---|---|---|
| *B32B 37/12* | (2006.01) | |
| *B65D 79/00* | (2006.01) | |
| *G01K 1/02* | (2021.01) | |
| *G01K 1/14* | (2021.01) | |

(52) U.S. Cl.
CPC ............. *B65D 79/00* (2013.01); *G01K 1/028* (2013.01); *G01K 1/14* (2013.01); *B32B 2553/00* (2013.01); *B65D 2203/12* (2013.01); *B65D 2571/00487* (2013.01)

(58) Field of Classification Search
CPC .. B65D 2571/00487; B65D 5/00; G01K 1/02; G01K 1/028; G01K 1/14; G01K 1/16; G01K 3/00; G01K 11/32; G08B 17/00
USPC .... 206/139–201, 459.1, 459.5; 374/120–141
See application file for complete search history.

(56) References Cited

U.S. PATENT DOCUMENTS

| | | |
|---|---|---|
| 3,545,475 A | 12/1970 | Johnson, Jr. |
| 4,538,926 A | 9/1985 | Chretien |
| 4,739,901 A | 4/1988 | Dorfman et al. |
| 4,878,588 A | 11/1989 | Ephraim |
| 5,110,012 A | 5/1992 | Scholle et al. |
| 5,251,787 A | 10/1993 | Simson |
| D343,129 S | 1/1994 | Farley |
| 5,482,373 A | 1/1996 | Hutchinson |
| 5,575,405 A | 11/1996 | Stratton et al. |
| 5,678,925 A | 10/1997 | Germaise et al. |
| 5,743,438 A | 4/1998 | Sokolnicki |
| 5,820,951 A | 10/1998 | Osborne |
| 5,897,207 A | 4/1999 | Hartmann |
| 6,164,469 A | 12/2000 | Sartore |
| 6,459,418 B1 | 10/2002 | Comiskey et al. |
| 6,513,379 B2 | 2/2003 | Meyers et al. |
| 6,544,614 B1 | 4/2003 | Huffer et al. |
| 6,864,462 B2 | 3/2005 | Sanoner et al. |
| 6,871,679 B2 | 3/2005 | Last |
| 7,022,946 B2 | 4/2006 | Sanoner et al. |
| 8,334,780 B1 | 12/2012 | Mendoza, Jr. |
| 8,905,635 B2 | 12/2014 | Clark et al. |
| 9,360,379 B2 | 6/2016 | Liu |
| 9,810,588 B2 | 11/2017 | Hashimoto et al. |
| 2003/0219061 A1 | 11/2003 | Seeger |
| 2006/0191812 A1 | 8/2006 | Oudekerk et al. |
| 2008/0142529 A1 | 6/2008 | LaGuardia et al. |
| 2008/0217362 A1 | 9/2008 | Vitantonio et al. |
| 2008/0283538 A1 | 11/2008 | Rowen |
| 2011/0210148 A1 | 9/2011 | Nelson et al. |
| 2015/0168223 A1 | 6/2015 | Hammond et al. |

FOREIGN PATENT DOCUMENTS

| | | |
|---|---|---|
| DE | 202006010942 | 10/2006 |
| EP | 2 574 891 | 4/2013 |
| FR | 840904 | 5/1939 |
| FR | 2579441 | 10/1986 |
| GB | 2465670 | 6/2010 |
| WO | WO 94/07791 | 4/1994 |
| WO | WO 2004/086112 | 10/2004 |
| WO | WO 2009/037436 | 3/2009 |
| WO | WO 2011/134039 | 11/2011 |

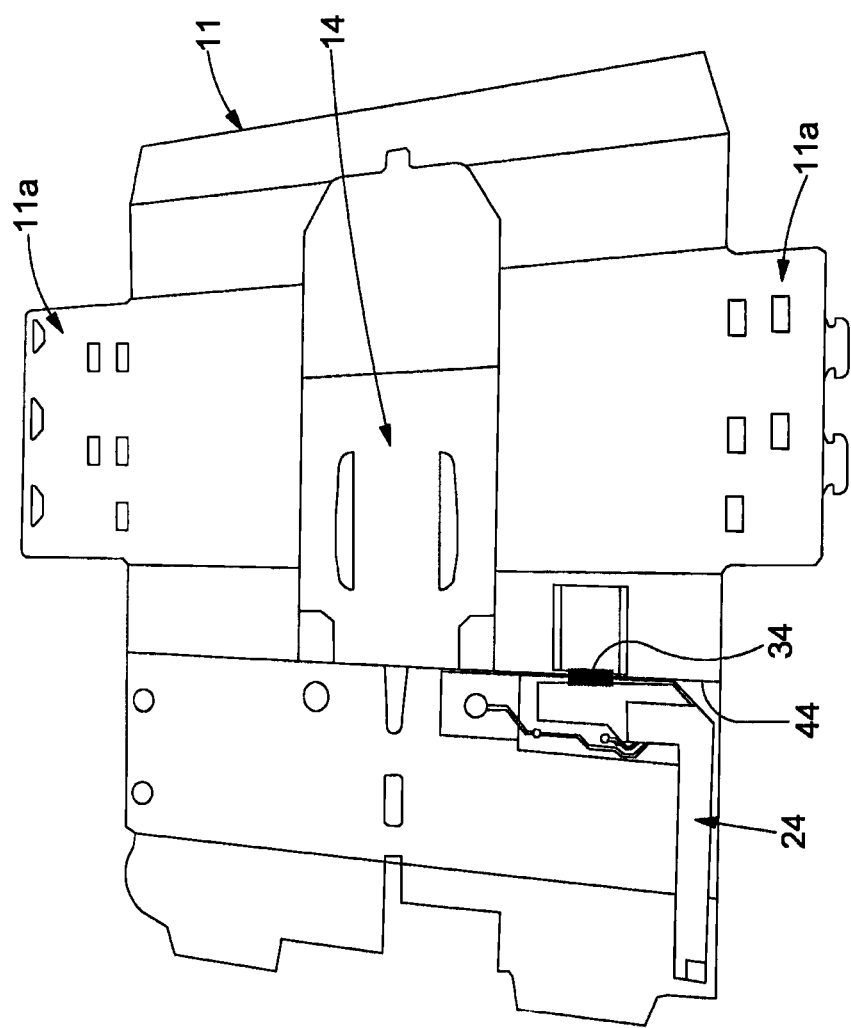

METHOD OF FORMING A PACKAGING

The present invention relates to packaging for one or more products and in particular, but not exclusively, to packaging for holding a plurality of products such as beverage containers.

BACKGROUND TO THE INVENTION

Packaging is known for accommodating a number of beverage containers such as bottles. Such packaging may be utilized, for example, for the storage and display of the beverages for retail, or for a consumer to place beverages therein when purchasing them from a retail outlet. A known form of packaging can accommodate six beverage bottles (a "six pack") and is formed from a cardboard blank. The blank is pre-formed with a particular shape and may comprise one or more tabs receivable within slots or apertures located elsewhere on the blank when the blank is folded into its final configuration. The blank is scored or pre-folded to facilitate assembly of the packaging. The blank can therefore be stored flat until it is required to be used at which point it can be assembled into its final form. The blank may be configured such that, on assembly, a plurality of compartments are formed that can each accommodate art individual beverage container. Alternatively, an insert can be placed in the cavity of the formed beverage container to provide the compartmentalization. In another known packaging, the sides and any inserts are secured in place during manufacture using adhesive, and the blank is scored or pre-folded again enabling it to transform from a flat, folded state to a fully assembled state.

Depending on the beverage in question, there may be a preferred or an ideal temperature for consumption, although it may not always be straightforward to test this. It is known to provide a solitary vessel such as a drinking mug or a cup with a temperature sensor and indicator, e.g. as in WO2009/037436 and U.S. Pat. No. 5,767,925. The former discloses a beverage monitor in the form of a clip that can be installed on a mug in order to monitor the temperature of a liquid placed therein. In the latter, a temperature sensor and indicator are pre-fabricated within a mug to provide an indication of the temperature of a liquid provided therein. Devices such as these are, however, only useful for directly indicating the temperature of a liquid in direct contact therewith. U.S. Pat. No. 8,334,780 describes an insulated holder with an integral electronic gauge that is intended for use with a single beverage container. GB 2465670 discloses a shopping bag comprising a temperature sensor and indicator to generally indicate the temperature inside the shopping bag. However, there exists a need to be able to accurately measure and display the temperature of packaged products such as a bottled beverage. The present invention has been devised with the foregoing in mind.

SUMMARY OF THE INVENTION

According to the present invention, there is provided a packaging as defined in claim 1. The invention advantageously provides packaging that can not only provide a real-time temperature display for products placed therein, but which can conveniently be assembled and re-folded for storage repeatedly and re-used when required.

In an embodiment, the integrated electronics module is, at least in part, printed onto the packaging. Alternatively, the electronics module is or comprises a foil or a film comprising one or more printed electronics components. In each case, advantageously, the electronics are 'integrated' with and/or into the packaging itself.

The integrated electronics module may be disposed between a first section and a second section of the packaging, the first section of the packaging being foldable with respect to the second section of packaging.

The integrated electronics module may comprise a power source such as a printed battery. It is an advantage that the power source is integrated within the packaging such that no power is required from additional, external resources.

The integrated electronics module may conveniently further comprise an activation or touch sensitive button for initiating a temperature measurement and/or display of the temperature measurement on the temperature display.

Preferably, one or more components of the integrated electronics module are laminated onto the packaging. In an embodiment, lamination is achieved by applying an adhesive film. This may be applied in the vicinity of the components only, a part of the packaging or across the entirety of the packaging.

The integrated electronics module may further comprise a processing device programmed with software to control the integrated electronics module. In an embodiment the processing device is programmed to switch the temperature measurement device and temperature display to a powerless standby mode after operation. The display may comprise a plurality of display segments and the processing device may be further programmed to activate individual segments of the display in sequence. The processing device may be further programmed to control the display to show the temperature measurement for a predetermined period of time such as approximately 3, 4, 5, 6, 7, 8, 9 or 10 seconds.

In an embodiment, the electronics module is located relative to the packaging such that, when fully assembled, one of said temperature measurement devices is disposed so as to be operable for measuring the temperature of two products. Each temperature measurement device may be in contact with two products, one product or no products. Preferably, one or more of the temperature measurement devices comprises a high ohmic device.

In an embodiment, the display is or comprises an electroluminescent, electrochromic or electrophoretic display.

According to a second aspect of the present invention, there is provided a method of forming packaging as defined in claim 23.

Providing the flexible electronics module on said packaging blank may comprise printing the flexible electronics module on said packaging blank. Alternatively, providing the flexible electronics module on said packaging blank may comprise providing a foil or a film comprising one or more printed electronics components on said packaging. The method may further comprise laminating one or more components of the electronics module onto the packaging. The laminating may comprise covering the one or more components of the electronics module with an adhesive film.

BRIEF DESCRIPTION OF THE FIGURES

Embodiments of the invention will now be described with reference to the following drawings, in which:

FIG. 1*a* shows a cardboard blank for forming the packaging of the first embodiment with integrated electronics positioned thereon;

DETAILED DESCRIPTION OF EMBODIMENTS OF THE INVENTION

Figure 1:
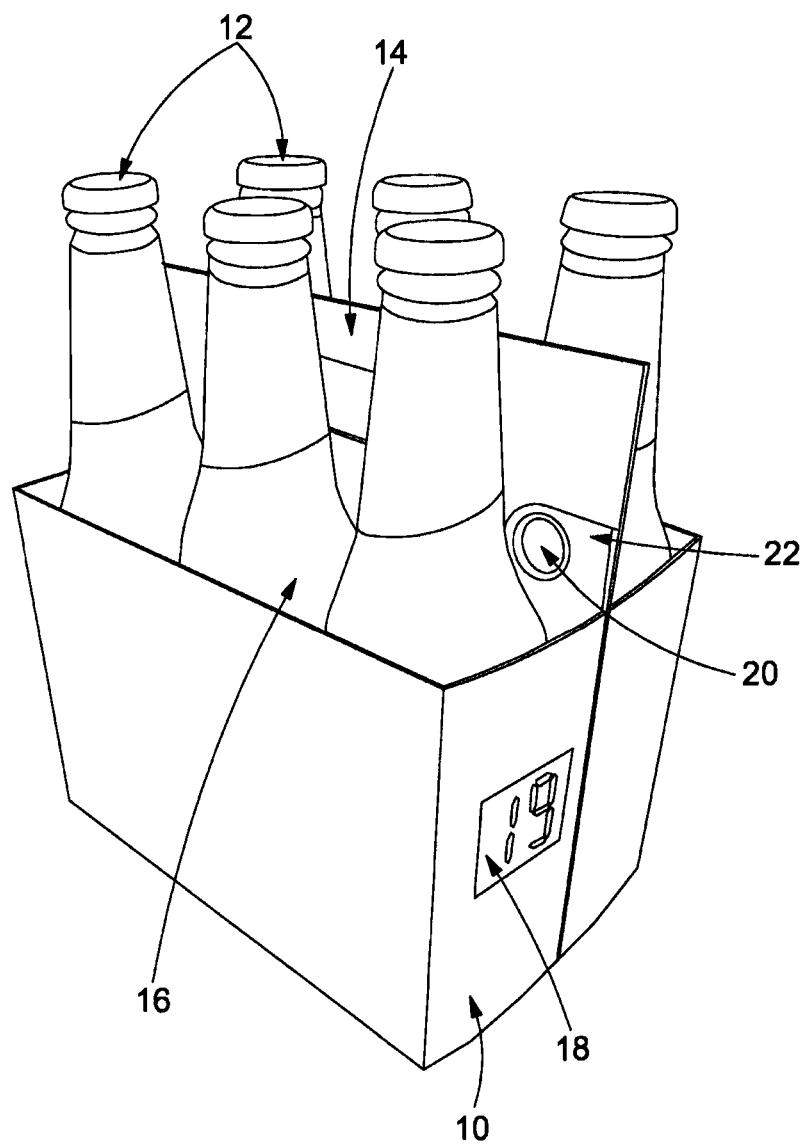
FIG. 1 shows packaging according to a first embodiment of the invention.

FIG. 1 shows a packaging 10 configured to accommodate a number of beverage containers 12. In the embodiment shown, the packaging can hold up to six bottled beverages 12 (a "six pack"), but the packaging 10 may instead be configured to hold any number of beverage containers e.g. 1, 2, 4, 8, 10 etc. The packaging 10 is formed from a flat or sheet blank 11 (see FIG. 1a) which, when folded and secured together using tabs/slots 11a, or prefabricated with adhesive in a known manner, provides the assembled bottle packaging 10. The packaging 10 can be formed of a single layer of card or, alternatively, can be corrugated card, paper or a flexible plastics material or other structurally stable material that can be formed (e.g. folded) into the assembled packaging 10. Thus, preferably, the packaging material is flexible but with some structural rigidity to ensure the packaging can hold and support contents placed therein. Embodiments of the invention provide packaging that is particularly suitable for use as secondary packaging. E.g. a beverage may be contained in a primary container such as a bottle or can, and the packaging of embodiments of the invention provide for secondary packaging for holding items of primary packaging. It will, however, be appreciated that embodiments of the invention can also be employed in other types of packaging e.g. primary (for non-beverage applications) and tertiary.

In its fully assembled form, the packaging 10 comprises a handle 14 and an internal cavity 16. The packaging 10 also comprises a base, two longitudinal side walls and two transverse end walls. The handle 14 provides a divider or partition defining two sub-compartments within the cavity 16 of the packaging 10. Further divisions (not visible in FIG. 1) may provide individual compartments for each beverage container 12 to be placed therein. The packaging 10 is formed from folding the blank 11 and securing together with tabs/slots 11a or with adhesive in a conventional manner. Folding the blank 11 into the assembled packaging 10, e.g. as shown in FIG. 10, and especially for embodiments comprising additional sub-compartments, provides the packaging 10 with structural rigidity such that the packaging 10 is capable of holding and transporting products 12 placed therein.

A visual display 18 is provided on or in the packaging 10 so as to be visible from an exterior viewpoint. The display 18 is configured to show information such as the temperature of one or more of the products 12 within the packaging 10. It may also be configured to show other information such as further environmental factors or an indication of the content of the packaging 10 e.g. the number of items 12. The packaging 10 is provided with an activation means 20 e.g. a touch sensitive button 22 that causes the display 18 to show the information. The electronics that controls the display, which will be discussed below, is preferably configured to automatically power down the display 18 after a few seconds, e.g. approximately 3, 4, 5, 6, 7, 8, 9 or 10 seconds. Alternatively, activating the button 22 a second time could actively cause the display 18 to power down.

Figure 2:
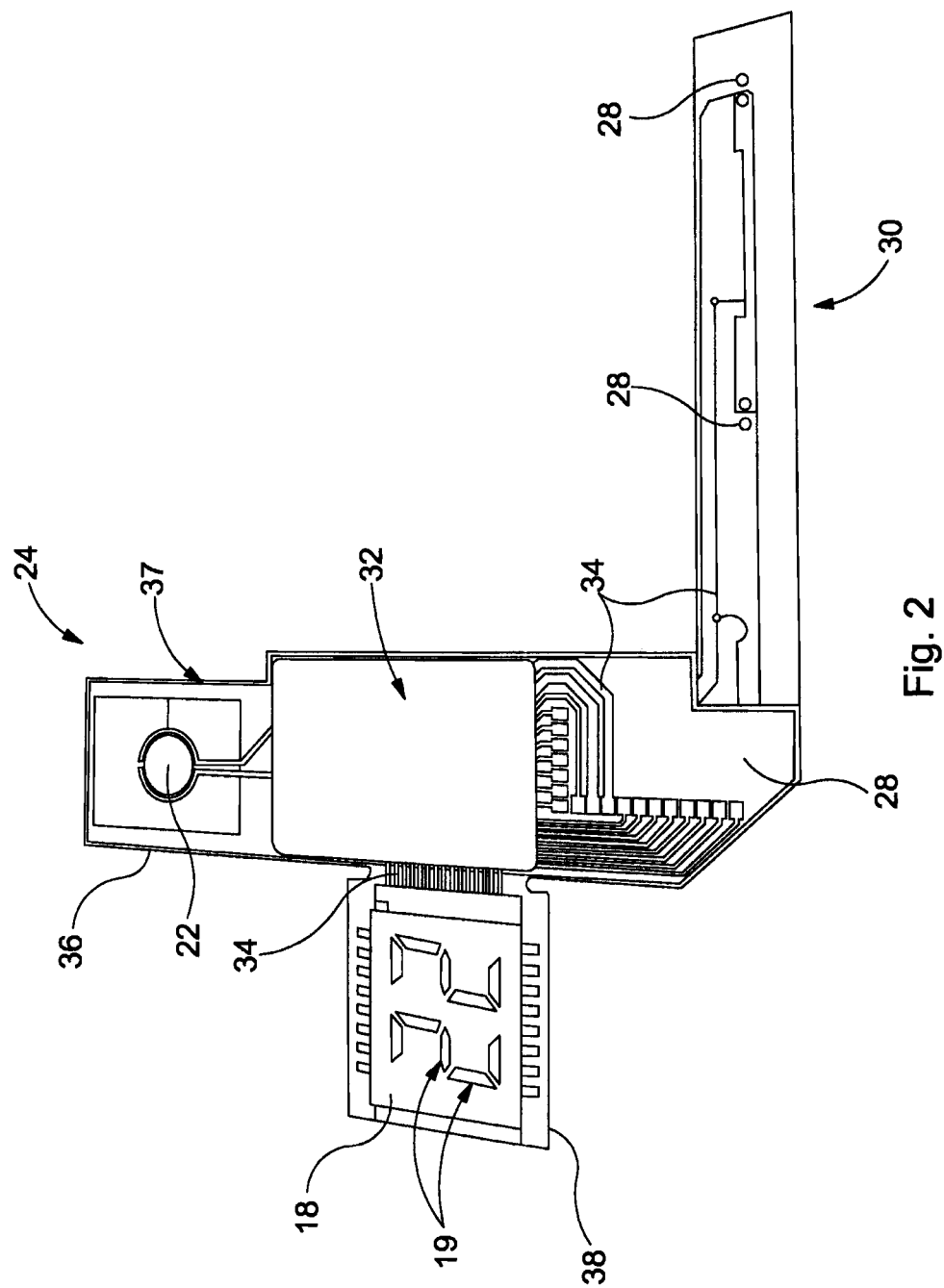
FIG. 2 shows integrated electronics incorporated in the first embodiment.

FIG. 2 shows an electronics module 24 that can be integrated into the packaging 10. The integrated electronics 24 are configured and programmed to control the display 18 in response to activation/deactivation of the touch button 22. The various components of the electronics module 24 can be provided directly on the packaging blank 10 or on a substrate that is then integrated with the packaging 10. It is convenient to print the components onto the packaging 10 or a substrate (such as a flexible printable circuit board) using known electronic printing techniques. Thus, for example, the touch button 22 and display 18 can be integrated with e.g. printed onto the packaging 10. The touch button 22 may be a push button, printed with conductive paste, and electronically connected to other components of the electronics module 24. An electrical connection is completed when a user touches the button 22, which activates the display 18. The display 18 may be an electroluminescent display comprising fluorescent inks that are activated by an electric current. Alternatively, the display 18 may be an electrophoretic or electrochromic display. In an embodiment, the display 18 comprises a plurality of segments 19 that can be selectively activated to show numbers or other information.

It is desirable to use a bi-stable display 18, which means that no current is consumed after displaying a value and thus battery capacity is conserved (as will be discussed below). This can be implemented by an electrochromic or electrophoretic display 18, which retains its content after switching. The display 18 may typically illuminate the temperature (or other information) reading for around 5-10 seconds before reverting to a standby (no display) mode. This has the benefit of reducing energy consumption and extending the lifetime of the electronics module 24. In an embodiment, an electrochromic bistable display (2 digits, 7-segment) supplied by Acreo is utilized.

One or more temperature measurement devices or sensors 28 are provided along a portion 30 of the module 24 that can come into contact with, or at least be adjacent to or in the vicinity of a product 12 when it is placed in the packaging 10. The arrangement of the temperature sensors 28 along the 'sensor stripe' 30 shown in FIG. 2 is configured for a 'six-pack' carrier as in FIG. 1, but it will be appreciated that other arrangements are also possible. A processing device (not visible in FIG. 2) and a power source 32 are also provided in the module 24. Conductive tracks 34 connect the various components in order to make the necessary electronic connections. The tracks 34 can be printed onto the packaging 10 with a conductive ink, or may be provided as a printed board, film or foil that is applied to the packaging 10.

The processing device is programmed with software that obtains a temperature measurement from one or more of the temperature measurement devices 28 and displays it on the display 18. The processing device may also comprise a memory device or function to retain and recall previous measurements. Advantageously, a microprocessor utilizing low-power CMOS technology is convenient to avoid high power consumption requirements. Exemplary processors that could be utilized are the MSP 430 from TI or a PIC 16 processor from Microchip. As such, embodiments of the invention provide a temperature sensitive display with an integrated electronic foil capable of measuring the temperature of the interior of a container such as a six-pack bottle carrier.

To further help conserve battery power, the temperature measurement devices 28 are also required to have low power consumption. Temperature sensors 28 in the form of high ohmic devices are convenient. It is also desirable that the temperature sensors 28 have a high degree of accuracy for reading and feeding back temperature for display. In the present embodiment, a negative temperature coefficient resistor (NTC) has been used, which reduces resistance with temperature: the higher the temperature, the lower the resistance. Use of positive temperature coefficient (PTC) resistors is also possible. In both cases, high temperature coefficients are favorable for measurement accuracy. The temperature characteristic of the resistor is stored in the microprocessor memory, and a temperature value is calculated by the software following a measurement of the resistance. The measurement cycle defined by the software comprises the steps of power up (wake up) of the electronics module 24, resistance measurement by one or mote of the sensors 28, a conversion step to translate the resistance measurement into a temperature reading, displaying the temperature reading on the display 18, after a period of time erasing the display and returning to power down (sleep) mode.

In an embodiment, individual temperature sensors 28 are provided for direct contact with each beverage container 12 placed in the packaging 10. In another embodiment, a single sensor 28 can be shared between two containers 12, one either side of the temperature sensor 28, to provide an accurate reading irrespective of whether there are two containers 12 in contact with the sensor 28, one container 12 in contact with the sensor 28 or no containers in contact with the sensor 28. Another software algorithm is programmed into the processing device to ensure the temperature display 18 accurately reflects the temperature of the product 12 and/or cavity 16 of the packaging 10 as required. The resistance of the temperature sensors 28 is measured and a temperature value is calculated for each as described above. In an embodiment, the lowest temperature is then shown on the display. Alternatively, other calculations could be performed, e.g. an average temperature could be displayed. Alternatively, the temperature of each cavity compartment could be displayed.

The temperature sensors 28 advantageously provide a temperature measurement to an accuracy of ±1° that is quickly displayed to a user. The accuracy of the measurement is primarily governed by the specifications of the temperature sensors. Furthermore, an accurate temperature measurement can be obtained irrespective of whether all of the beverage container compartments are occupied, just one, or a number in between. The temperature sensors 28 can also provide a temperature measurement if no products 12 are present in the packaging 10. In this case, the temperature measurement is a measurement of the environmental temperature.

The power source may be a printed battery or a printed photovoltaic power source 32, printed directly onto the packaging 10 or the substrate. A flat, portable printed battery 32 conveniently offers sufficient power to operate the integrated electronics 24 from the start of the temperature measurement to displaying the value of the measured temperature on the display 18. To avoid any unwanted energy loss, it is desirable for components of the electronics module 24 to enter a powerless standby mode after the measurement and display operation. During development of embodiments of the invention it was discovered that, after activating the electronics module 24 by pressing the printed touch sensitive button 22 to initiate the temperature measurement, initial high current loads were experienced that led to sudden voltage drops due to the internal battery resistance. A software sequence was therefore developed that activates individual segments 19 of the display 18 sequentially, i.e. one segment 19 at a time, and at a limited switch speed, rather than in parallel. The sequential activation can be conducted in the order of micro-seconds, to avoid loss of performance. By way of an example, for the present circuit, the display segments 19 were switched on sequentially with an interval of approximately 0.7 seconds. This sequential switching resulted in the elimination of spikes in power that could otherwise overload the battery and cause the electronics module 24 to fail. This also reduces the overall consumption of battery energy and, as a result, extends the life of the electronics module 24 and thus the packaging 10 and makes the module 24/packaging 10 more efficient as it does not require additional or higher voltage energy sources. A photovoltaic power source printed on the packaging 10 is possible as an alternative to a printed battery, although it was found that the conversion rate of light to energy can result in there being too little self-generating energy to power the electronics module 24.

As can be seen in FIG. 2, the electronics module 24 is substantially L-shaped. That is to say, a first, generally elongate section 36 of the module 24 is formed with or connected to a second generally elongate section 30 of the module 24 such that the two sections 30, 36 are provided at an angle to each other but within a common plane. Conveniently, the two module sections 30, 36 are provided substantially at 90° to one another within a first plane. When the packaging 10 is fully assembled, the first and second module sections 36, 30 extend substantially perpendicularly to the base of the packaging 10, i.e. substantially vertically. The second module section 30 extends along the length of the packaging 10, and the first module section 36 extends transversely thereto (substantially upwardly or vertically in the embodiment of FIG. 2). When integrated in the packaging 10, this arrangement enables one or more products 12 to be placed on either side of the second module section 30. I.e. three products 12 can be placed either side of the divider portion 30 for the embodiment of FIG. 2. The touch button 22 is provided at or towards the free end 37 of the first module section 36. The free end 37 of the first module section 36 extends above the main body of the packaging 10 such that the touch button 22 is easily accessible by a user. The packaging 10 is, however, configured such that only the display 18 and the touch button 22 are visible and accessible to a user. I.e. the remaining portions of the electronics module 24 are integrated within the main body of the packaging 10 and are not immediately visible or accessible to a user. This avoids undesirable damage thereto or tampering thereof.

The display 18 is located on a third section 38 of the module that is located adjacent the first module portion 36. The third module section 38 is integrally formed with or connected to the first module section 36. In the embodiment shown, the third module section 38 is located at a position approximately halfway along the length of the first module section 36. This conveniently enables the display 18 to be mounted in the main body of the packaging 10 as visible in FIG. 2. However, the third module section 38 may alternatively be provided at a different location along the length of the first module section 36, or the display may be provided directly on the first or second module section 36, 30.

As discussed above, the packaging 10 is formed of a flexible material, but one which also provides some structural rigidity which, in this embodiment, is due to the folding of the packaging/substrate material and the inherent strength of the material itself. This enables the third module section 38 to be bent or folded with respect to the first module section 36. As such, when the packaging 10 is fully assembled, the display 18 is located in a different plane to the touch button 22. In the example shown in FIG. 1, these planes are substantially perpendicular to each other.

Figure 3:
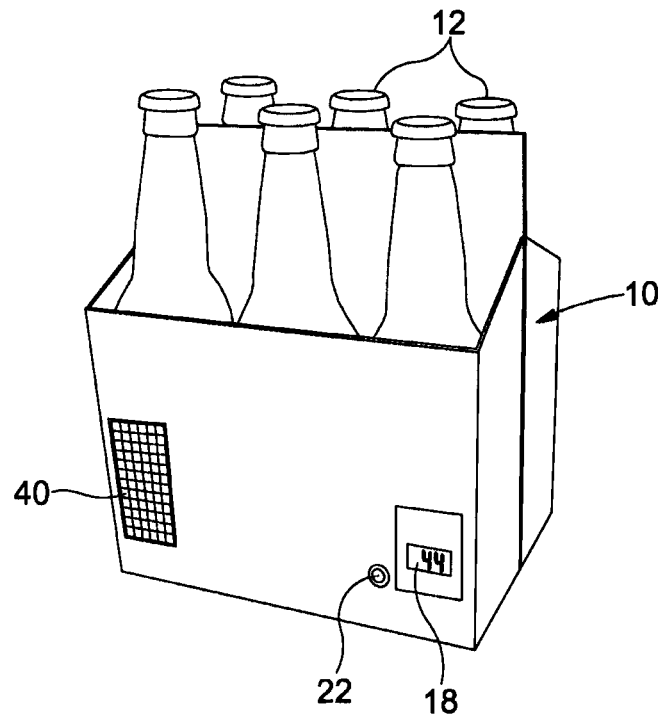
FIG. 3 shows packaging according to a second embodiment of the invention.

An alternative embodiment of the invention is shown in FIG. 3. Here, the touch button 22 is located adjacent the display 18 on a front face of the packaging 10. A power source 40 is also provided on a front face of the packaging 10, spaced from the display 18 and touch button 22, although they may be arranged in other configurations. Similar to the earlier described embodiments, a power source 40, touch button 22 and display 18 are printed/provided on a packaging blank 10 which, when folded into a fully assembled form, positions these components so as to be visible to a user. The remainder of the electronics module 24 is concealed within the cavity of the packaging 10.

The sub-components of the electronics module 24 are both passivized to eliminate any potential for energy to leak out from the printed circuit and laminated to physically protect the sub-components from physical damage. This is done by encapsulating the printed elements with an overcoat of adhesive film, e.g. a polymer material, effectively sandwiching the electronic components between the adhesive film d the packaging 10. This also has the advantage of protecting the components from humid and wet environmental contact during the production and supply chain conditions. By laminating the electronics 24, they remain flexible whilst avoiding hard creasing/perforation and direct impact that can lead to the flexible electronics module 25 buckling or snapping resulting in potential damage of the functional performance. The lamination process has to take into account the rigors of the industrial packaging conversion process and product manufacture packing processes, distribution and end consumer/customer environment. This is achieved e.g. by employing a temperature controlled lamination process. The assembly process must employ only a moderate temperature for curing, so as to avoid damage to components such as the display 18 and the battery 32, and an adhesive polymer film has been found to be suitable. Lamination may be achieved by selectively coating the packaging 10 with an adhesive by means of a shadow mask and joining the electronic foil to the packaging 10 using an automatic pick and place process to complete the integration of the electronics.

Placing a drop of epoxy material on solder joints and components as required can provide additional protection from high mechanical stresses that might be endured during the bottle packing process.

Thus, in some embodiments, the electronics module 24 including the display 18, the touch button 22 and optionally the power source are provided or printed directly on the packaging 10. Alternatively, these components 24 can be provided on a substrate (e.g. of a flexible plastics material) that can be incorporated into the packaging 10 e.g. by providing the substrate on the exterior of the packaging 10, or providing the substrate internally thereof and providing apertures or openings in the packaging 10 to allow visibility of/access to the components. In a preferred embodiment, the electronics module 24 is printed directly onto the packaging material (e.g. card) or applied as a film or foil thereto. The components are arranged e.g. as shown in FIG. 2 such that, on assembly of the packaging 10, the display 18 and touch button 22 (and optionally the power source) are located on the exterior thereof, and other components are located internally.

Figure 4:
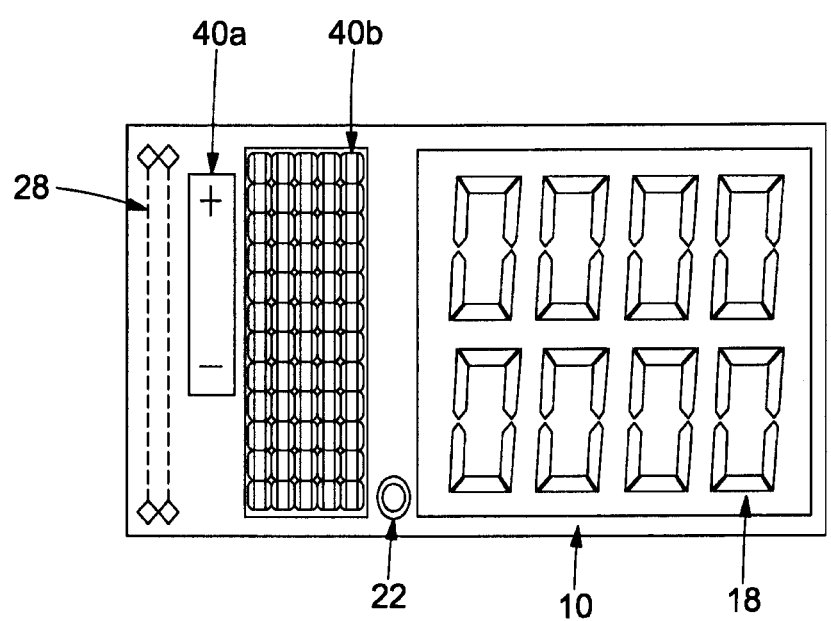
FIG. 4 shows integrated electronics incorporated in the second embodiment.

FIG. 4 shows an example of various components printed on a portion of packaging 10. Two forms of power source are indicated: a printed battery 40a or a printed photovoltaic cell 40b. Only one of these would be needed in packaging 10 according to embodiments of the invention. The photovoltaic cell 40b would need to be integrated in the packaging 10 such that the cells thereof are able to receive light energy; the battery 40a need not be visible or accessible from the exterior of the packaging 10.

An exemplary electro-luminescent display 18 having a digital readout, and touch button 22, are also shown in FIG. 4. A temperature measurement means 28, in the form of a bimetallic thermostat, is also printed on the packaging 10. These are examples only, and other variants of these components could also be utilized.

Figure 5A:
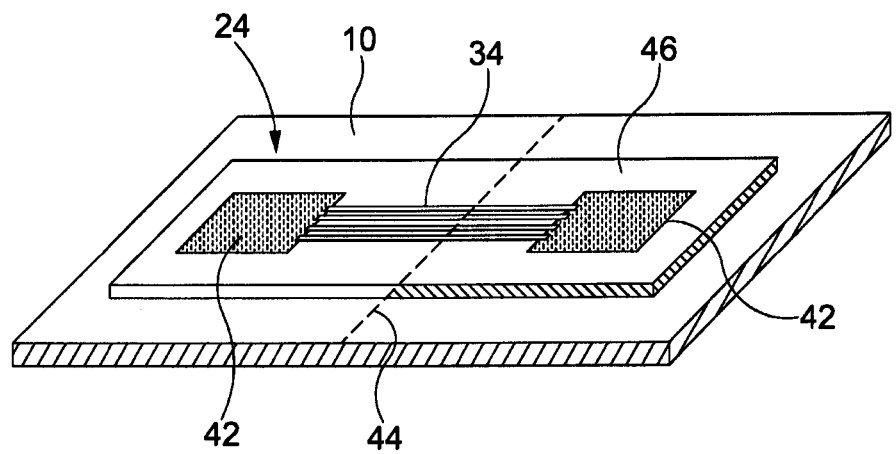
FIGS. 5a and 5b are schematic views of integrated electronics according to a further embodiment of the invention.
Figure 5B:
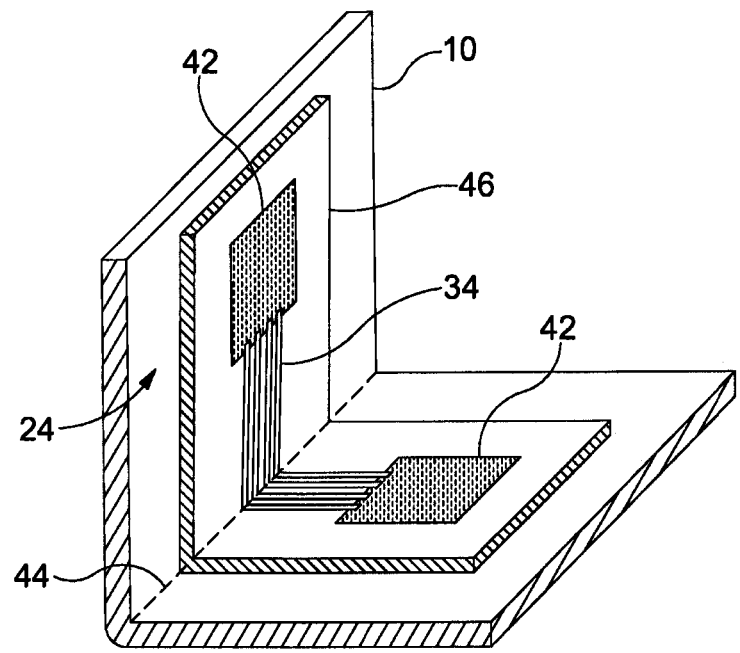

FIGS. 5a and 5b illustrate an important feature and advantage of the invention—the ability to be able to fold or bend the packaging 10—with integrated electronics 24 provided or printed thereon—into the desired shape in order to form or assemble the packaging 10. FIG. 5a shows a portion of packaging 10 in an unfolded form. An electronics module 24 is provided thereon and is laminated with a layer of laminate material such as adhesive 46. Two exemplary electronics components 42 are depicted, which represent e.g. a battery and a display 18. Printed connection tracks 34 connect the two components 42. The packaging 10 is required to be folded along line 44 and may, for example, be scored or pre-folded along the line 44 to assist folding thereof during assembly of the packaging 10. FIG. 1a shows an exemplary blank 11 with the integrated electronics 24 positioned thereon, showing where the blank 11 and electronics 24 are folded in order to form the packaging 10.

Because of the flexible nature of the electronics module 24, when the packaging 10 is bent, folded or deformed, the integrated electronics module 24 also bends without damage to the electronics components 24 or connections 34 provided or printed thereon. Of course, repeated bending or folding may eventually lead to damage to the components. However, the following steps have been taken to minimize this risk, to ensure the integrated elect lilies remain undamaged for as long as possible. Firstly, the radius of the folding is typically between 0.5 to 2 mm, and a bending radius of 1 mm has been found to be effective. Secondly, using Coverne HSPL80 as the substrate for the ring foil has been found to prolong the product lifetime. Thirdly, protecting the folding area with a printed passivation, but preferably with a cover foil, has also been demonstrated to be beneficial. In this combination, up to twenty bending cycles have been passed without conductor failures (open conductor lines). The resistance of 20 conductor lines during folding was monitored as an indicator for degradation and resistance increase was limited to an acceptable level less than 30% in this combination.

Experiments have been conducted to demonstrate that a package with printed electronics according to embodiments of the invention can survive the harsh processing conditions that exist during converting and in an automatic packaging line. A measured yield of 90% after fabrication has been achieved, the main failure cause being printed battery performance. During converting to baskets, 13% of packages were lost and after the packaging process in brewery 80% of all packages fulfilled a full functional test and temperature measuring specifications. Such packages with integrated electronics can therefore meet factory requirements.

Embodiments of the invention thus provide a user with an intelligent and interactive interface that is capable of providing live temperature measurements on demand. The packaging 10 is versatile in that it can be assembled and collapsed, and reused as required. The lifetime of the power source or battery will determine the lifetime of the integrated electronics module 24. Alternatively, a replaceable battery could be incorporated into the module 24 to help reusability of the module 24 and the assembly 10. Embodiments of the invention also provide for packaging the aesthetics of which are defined by both graphics and technology—a combination of any visual presentations on the packaging material 10 and the visible components of the electronics module 24 such as the display 18, touch button 22 and external power source (if present). The exterior of the packaging, in some embodiments, is a combination of printed technology and printed graphics, without there being a readily perceivable difference therebetween.

Embodiments of the invention provide packaging incorporating integrated electronics which, when integrated with a number of connected sub-components, such as a live temperature measuring system 28, printed battery source, printed display 18, flexible printed circuits and printed logic memory 24, allow the consumer "live feedback" on the "actual temperature" of the beverage bottles 12 in the packaging 10. The integrated electronics 24 do not disturb or confine the original fabrication process, shape or function of the packaging 10. This is achieved by providing an integrated electronics module 24 that is flat and flexible (e.g. a foil or flexible film) and able to be integrated into all packaging materials 10.

By integrating passivation and lamination of the flexible foil circuit 24 (to mitigate the impact of wet humid contact) along with the ability for this foil to flex and stress whilst also being protected from physical damage whilst packing the product (by folding the electronics 24 into the packaging 10 with the assistance of a laminated film 46 providing protection to hard folds, a packaging 10 can be provided that delivers accurate, consistent and repeatable temperature measurement and display performance. In particular, the passivation/film lamination of the printed tracks aims to avoid cracking or severing thereof during the integration and use of the pack.

A number of factors thus combine to provide desirable performance characteristics in a product that is a breakthrough in consumer facing innovation, including:

- accurate temperature measurement achieved by selecting a printed sensory 28 that has the desired level of sensitivity and by the software algorithm that conveys the temperature measurement to the display 18 and can accurately assess two containers 12 in contact, one container 12 in contact and zero containers in contact with the temperature sensor 28, and compose this as a subset of the total array of temperature sensors 28 to provide an overall temperature reading;
- a power source that is capable of providing a long and consistent source of power, this being provided not only by the flexible battery but the software drivers programmed into the module 24 to avoid over-consumption of energy;
- a clear display 18 that can be viewed at a wide viewing angle and in bright daylight to partial light and the flexibility to integrate into a wide range of packaging materials including, for example, paper, card or cardboard, corrugated card or cardboard, plastic film and metal;
- passivation and lamination to protect electronic sub-components from environmental and physical impacts;
- sequenced approach to temperature measurement reading and display, to ensure longevity and avoid power failure from energy spikes; and/or
- Integration of sub-components 24 in a novel way to produce a consumer facing value added set of functions and ease of integration across multiple shapes and forms.

The invention claimed is:

1. A method of forming packaging for accommodating one or more products, the method comprising:
   providing a planar packaging blank of foldable material, the blank folds into packaging to contain one or more products;
   providing a flexible electronics module on said packaging blank, the electronics module comprising one or more temperature measurement devices for measuring a temperature of at least one of the one or more products and a temperature display displaying the temperature of one or more of the one or more products; and
   positioning said flexible electronics module with respect to said packaging such that both can be folded together to form the assembled packaging, the packaging comprising an electronics module integrated therein that comprises one or more temperature measurement devices directly measuring a temperature of at least one of the one or more products and a temperature display displaying the temperature of one or more of the one or more products, wherein the packaging is foldable from a first unassembled state to a second assembled state to enable one or more of the one or more products to be accommodated, and said electronics module is at least partly flexible to enable it to be folded with the packaging, wherein the integrated electronics module further comprises a processing device programmed with software to control the integrated electronics module.

2. The method according to claim 1, wherein providing the flexible electronics module on said packaging blank comprises printing the flexible electronics module on said packaging blank.

3. The method according to claim 1, wherein providing the flexible electronics module on said packaging blank comprises providing a foil or a film comprising one or more printed electronics components on said packaging.

4. The method according to claim 1, further comprising laminating one or more components of the electronics module onto the packaging.

5. The method according to claim 4, wherein the laminating comprises covering the one or more components of the electronics module with an adhesive film.

6. Packaging for one or more products, the packaging comprising an electronics module integrated therein that comprises one or more temperature measurement devices directly measuring a temperature of at least one of the one or more products and a temperature display displaying the temperature of one or more of the one or more products, wherein the packaging is foldable from a first unassembled state to a second assembled state to enable one or more of said products to be accommodated, and said electronics module is at least partly flexible to enable it to be folded with the packaging, wherein the integrated electronics module further comprises a processing device programmed with software to control the integrated electronics module.

7. The packaging according to claim 6, wherein said integrated electronics module is, at least in part, printed onto the packaging.

8. The packaging according to claim 6, wherein the electronics module is or comprises a foil or a film comprising one or more printed electronics components.

9. The packaging according to claim 6, wherein the integrated electronics module is disposed between a first section and a second section of the packaging, the first section of the packaging is foldable with respect to the second section of packaging.

10. The packaging according to claim 6, wherein the integrated electronics module comprises a power source.

11. The packaging according to claim 6, wherein the integrated electronics module further comprises an activation or touch sensitive button for initiating a temperature measurement or display of the temperature measurement on the temperature display.

12. The packaging according to claim 6, wherein one or more components of the integrated electronics module are laminated onto the packaging.

13. The packaging according to claim 12, wherein one or more components of the integrated electronics module are covered in adhesive film.

14. The packaging according to claim 6, wherein the processing device is further programmed to switch the temperature measurement device and temperature display to a powerless standby mode after operation.

15. The packaging according to claim 14, wherein the display comprises a plurality of display segments and the processing device is further programmed to activate individual segments of the display in sequence.

16. The packaging according to claim 15, wherein the processing device is further programmed to control the display to show the temperature measurement for a predetermined period of time.

17. The packaging according to claim 16, wherein the processing device is programmed to control the display to show the temperature measurement for approximately 3, 4, 5, 6, 7, 8, 9, or 10 seconds.

18. The packaging according to claim 6, wherein the electronics module is located relative to the packaging such that, when fully assembled, one of said one or more temperature measurement devices is disposed so as to be operable for measuring the temperature of two products.

19. The packaging according to claim 18, wherein each temperature measurement device is in contact with two products, one product or no products.

20. The packaging according to claim 6, wherein the one or more temperature measurement devices comprise a high ohmic device.

* * * * *